July 24, 1951     I. FRAZEE     2,562,142
TURNING ANGLE INDICATOR
Filed Aug. 14, 1947     3 Sheets-Sheet 1
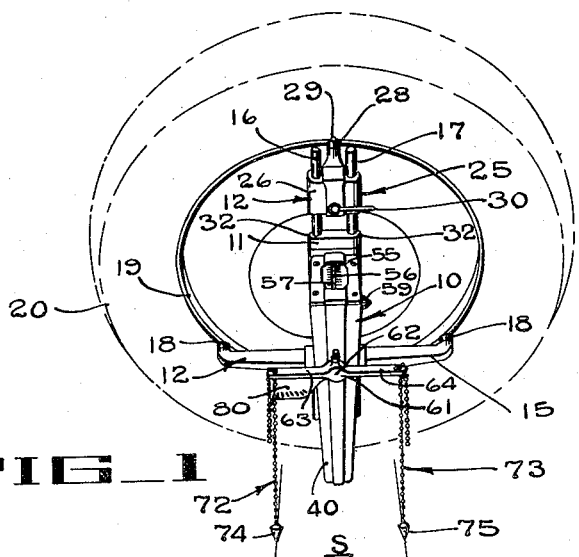
FIG_1
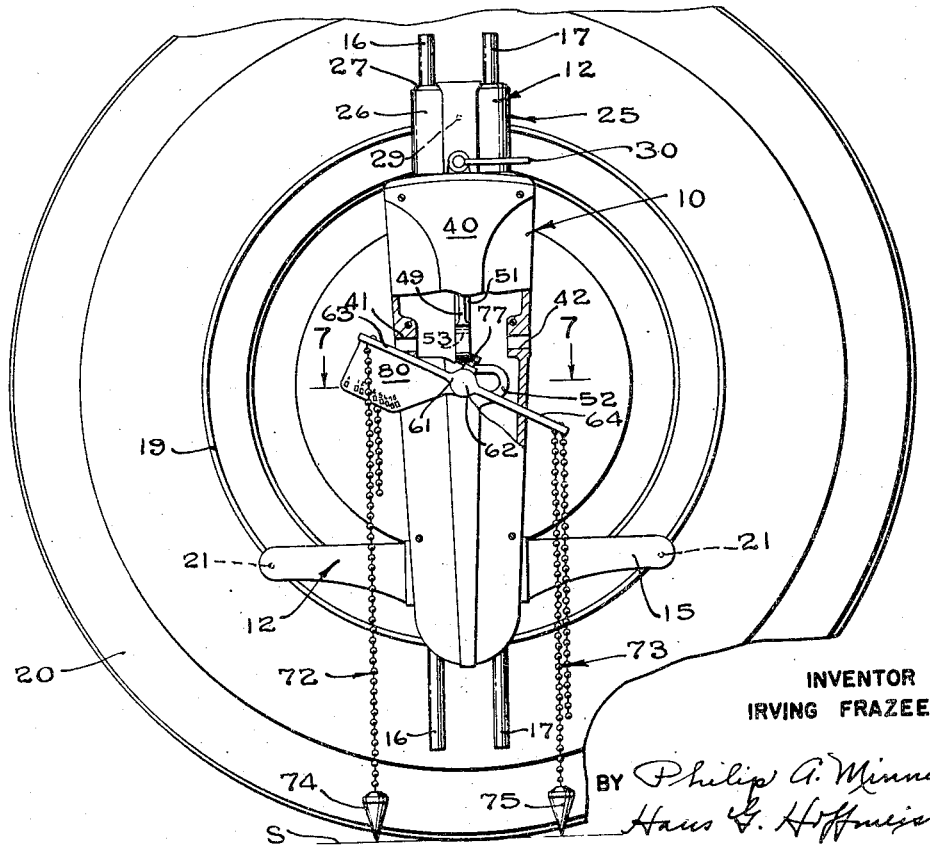
FIG_5
INVENTOR
IRVING FRAZEE
BY Philip G. Minnis
Hans G. Hoffmeister
ATTORNEYS July 24, 1951          I. FRAZEE          2,562,142
TURNING ANGLE INDICATOR
Filed Aug. 14, 1947          3 Sheets-Sheet 2
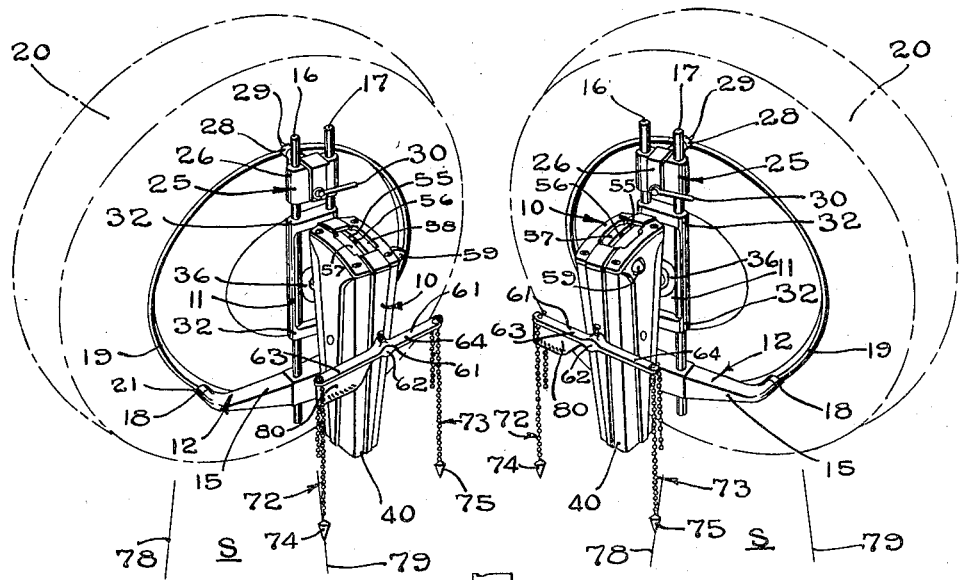
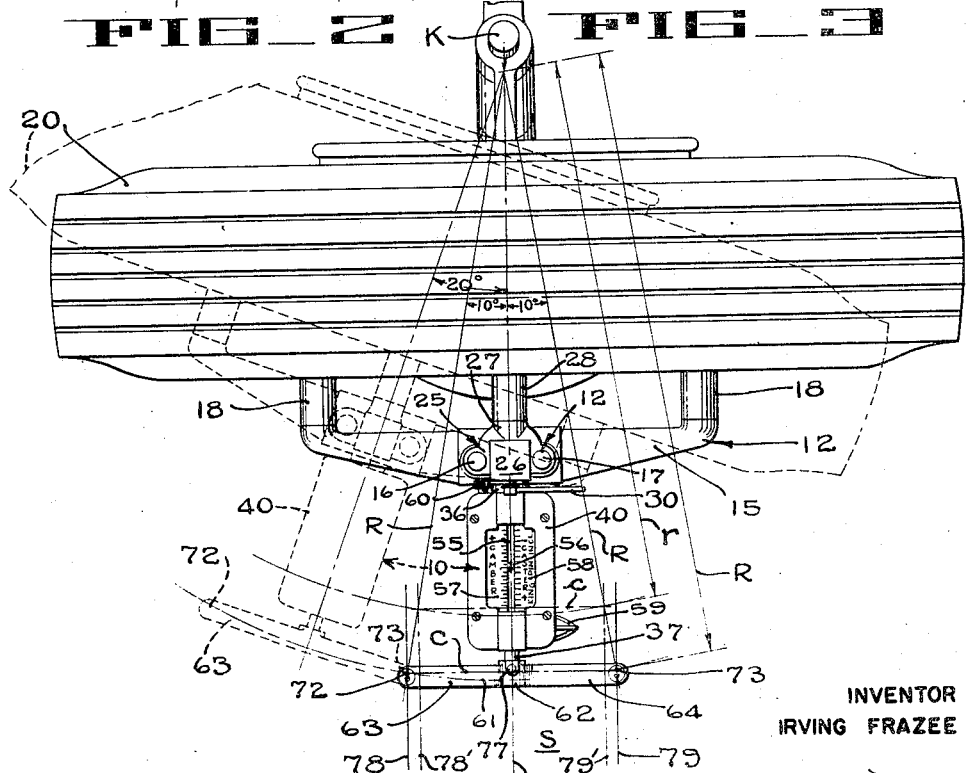
INVENTOR
IRVING FRAZEE July 24, 1951      I. FRAZEE      2,562,142
TURNING ANGLE INDICATOR
Filed Aug. 14, 1947      3 Sheets-Sheet 3
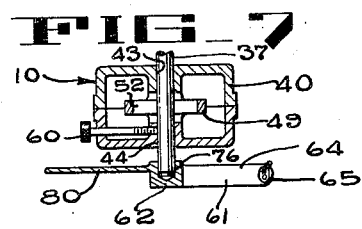
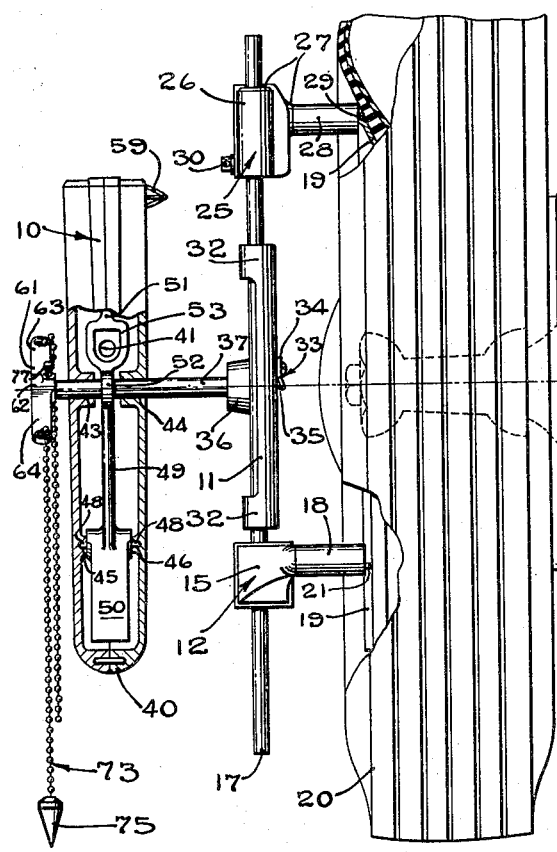
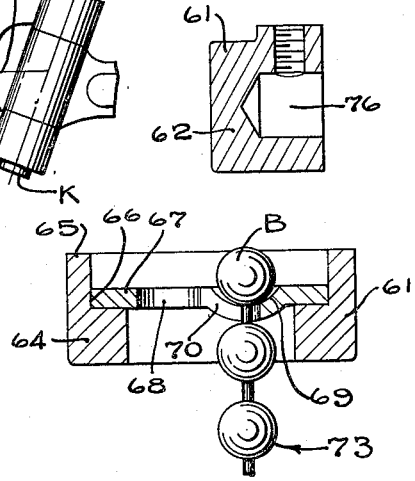
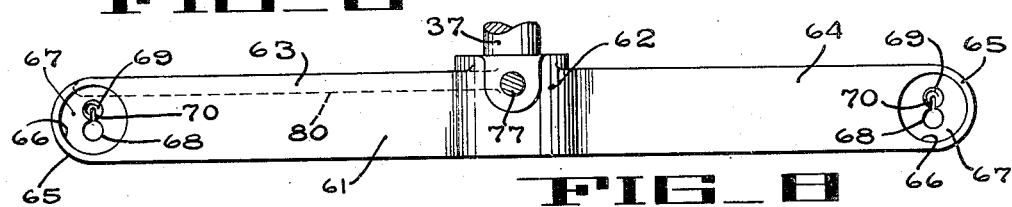
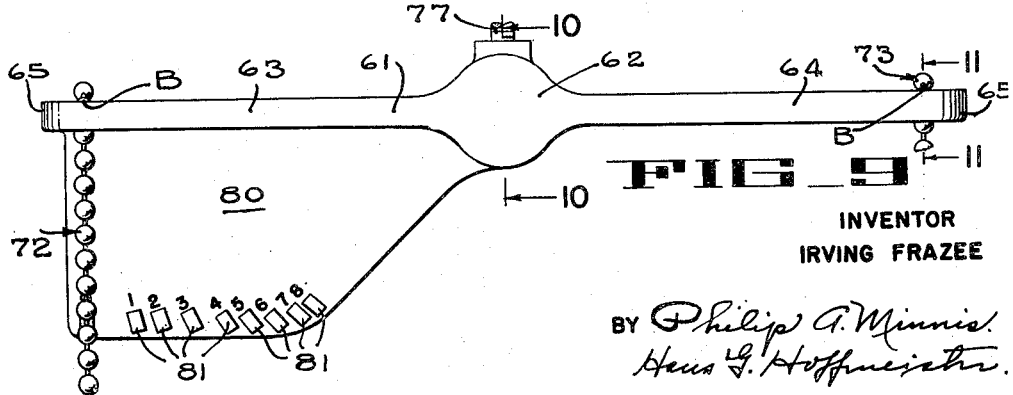
INVENTOR
IRVING FRAZEE
ATTORNEYS Patented July 24, 1951

2,562,142

UNITED STATES PATENT OFFICE 2,562,142

TURNING ANGLE INDICATOR

Irving Frazee, Detroit, Mich.

Application August 14, 1947, Serial No. 768,652

14 Claims. (Cl. 33—203.18)

This invention relates to the art of aligning dirigible vehicle wheels such as the front wheels of an automobile and is particularly concerned with the provision of an improved form of turning angle indicator adapted to facilitate the positioning of such wheels at desired turning angles for test purposes.

In testing a dirigible vehicle wheel to determine the presence and degree of such alignment characteristics as caster and king pin inclination, it is a conventional practice to turn the wheel successively to selected angular settings on opposite sides of straight ahead position and to determine the desired alignment characteristics by gauging certain differences in attitude of the wheel at these settings.

In those cases where the alignment gauging apparatus is employed in conjunction with a turntable or other wheel support, the proper angular setting of the wheel is generally accomplished by reference to a suitable turning scale or sighting lines provided on the turntable or other portions of the supporting structure. In some instances, however, particularly when certain types of portable alignment gauges are used, it is sometimes desired to carry out the tests without any special wheel support other than the floor of the garage or other place where the vehicle may happen to be standing at the time, and where no fixed reference means are present to enable accurate setting of the wheel to the proper angles.

It is the general object of my invention to provide a turning angle indicator which can be used under the latter circumstances to enable an operator to set the wheel to the proper angle for testing.

More particularly it is an object of my invention to provide a simple and effective turning angle indicator which may be applied to a dirigible vehicle wheel and utilized for accurately setting the wheel to desired angular positions for test purposes.

Another object is to provide a turning angle indicator of the character referred to which may be used with various makes and types of wheel mountings having different radii of swing relative to their king pin assemblies.

Other objects and advantages of the invention will become more apparent from the following description of a preferred form of construction embodying it, and the accompanying drawings wherein it is illustrated.

It may be pointed out here that my invention may be used entirely independently of any alignment gauging apparatus if so desired. However, since it is expected that it will generally be used in conjunction with some sort of gauging apparatus, it is believed that its operation, advantages, and principal field of utility will most readily be understood if so disclosed. I have, therefore, illustrated and shall hereinafter describe my invention as it may be used in association with a well known make of alignment measuring gauge now on the market; it being understood that any one of various other gauges may be substituted for the one shown if desired, or it may be eliminated altogether.

In the drawings:

Fig. 1 is a perspective view of an automobile wheel having applied thereto a turning angle indicator embodying my invention and also a wheel alignment measuring gauge of the character referred to above.

Fig. 2 is a perspective view of the turning angle indicator of Fig. 1 with the wheel turned in one direction; while Fig. 3 is a perspective view of the same with the wheel turned in an opposite direction.

Fig. 4 is an enlarged plan view of the wheel and attachment shown in Fig. 1.

Fig. 5 is a side elevation, partially in section, of the assembly shown in Fig. 1 and illustrating the turning angle indicator in a different position with respect to the wheel.

Fig. 6 is an end elevation, partially in section, of the assembly shown in Fig. 5.

Fig. 7 is a section through the alignment measuring gauge and turning angle indicator taken along line 7—7 of Fig. 5.

Fig. 8 is a detail of the crosshead forming a part of the turning angle indicator of my invention.

Fig. 9 is a side view of the cross head and attachments therefor.

Fig. 10 is a section through the hub portion of the crosshead shown in Fig. 9 taken along line 10—10 thereof.

Fig. 11 is a section through one extremity of the crosshead shown in Fig. 9 taken along line 11—11 thereof.

In the apparatus illustrated, the alignment measuring gauge is indicated at 10, and is shown as being supported from a bracket 11, mounted on a clamp 12. The clamp 12 is of substantially the same construction as that shown and described in the copending application of Tracy Carrigan Ser. No. 615,444 filed Sept. 10, 1945. It has the general form of an inverted T having a cross arm 15 from which a pair of parallel rods 16 and 17 project upwardly and constitute the stem of the T. Each extremity of the arm 15 is provided with a spacer block 18 adapted to rest against the outer face of the rim 19 of a wheel 20 and having a screw stud 21 for engaging the periphery of the rim.

For the purpose of enabling the clamp 12 to be easily and quickly attached to the wheel 20, it is provided with a locking device 25 slidably mounted on the two rods 16 and 17. This locking device is substantailly the same as the one shown in the aforementioned Carrigan application, except that it has been illustrated herein as being provided with a snugly fitting dust cover 26. Briefly, it comprises a body 27 carrying on its rear face a spacer block 28 similar to the blocks 18, and having a stud screw 29 for engaging the periphery of the rim 19. The slidable locking device 25 is normally adjusted to a position which permits the screw studs 21, 29 to be positioned over the periphery of the rim 19, as previously explained. The locking device 25 is controlled by a handle 30 which, when turned, actuates a spring urged clamp, not shown, for securing the locking device in position on the rods 16 and 17. The screw studs 21 and 29 are thereby caused to cooperate with each other to clampingly engage the rim 19 of the wheel to support the clamp 12 firmly at one side of the rim.

Since the particular construction of the clamp 12 and its locking device 25 forms no part of my invention, it is believed that further description of these parts is unnecessary and reference is made to the aforesaid Carrigan application for additional details.

The bracket 11 comprises a body of substantially rectangular form having aligned bosses 32 at each side thereof (Figs. 2, 3, and 6) each boss having openings bored lengthwise thereof for receiving the respective rods 16 and 17 whereby the bracket is slidably supported by the rods for movement rectilinearly thereon. The back of the bracket 11 is provided with friction devices 33 (Fig. 6), each of which comprises a leaf spring 34, having one end secured to the back face of the bracket and a detent 35 at its opposite end extending through an opening provided in the bracket. The detents 35 bear against the respective rods 16 and 17 to retain the bracket in adjusted position on the rods.

The front face of the bracket 11 has a boss formation 36 thereon from which extends a shaft 37 adapted to pivotally support the gauging mechanism 10 so that the latter will normally hang in a vertical position. The shaft 37 is preferably disposed coaxially with respect to the wheel by adjusting the bracket 11 along the rods 16 and 17 as above explained.

The gauging apparatus 10 comprises a hollow casing 40 of generally rectangular cross section provided with aligned bores 41 and 42 in its vertical end walls, and similarly aligned bores 43 and 44 in its vertical side walls, the axis of the bores 41, 42 being offset vertically relative to the axis of the bores 43, 44, as is shown in Figs. 5 and 6. The lower region of the casing 40 (Fig. 6) is also provided with aligned bores 45, 46 which are parallel to the bores 43, 44 for pivotally supporting pintles 48 extending laterally from a pendulum pointer 49. The portion 50 of the pendulum 49, below the pintles 48, is weighted so as to maintain the pointer portion 51, thereabove, in vertical position. The pointer portion 51 is provided with an arcuate eye 52 in alignment with the aforementioned bores 43, 44, and a similar eye 53 is in alignment with the bores 41, 42 to permit swinging movement of the pointer and casing relative to each other without interference from the shaft 37.

The upper end of the pointer portion 51 extends into a slot 55 in the upper end of the casing 40 to provide a needle pointer 56 associated with graduated scales 57 and 58 on either side of the slot 55 for indicating the angular tilt of the pendulum 49 relative to the casing 40. The scale 57 is a fixed scale calibrated to read in inches or degrees of camber while the scale 58 ils adjustable and calibrated to read in degrees of caster or king pin inclination. The adjustable scale 58 is in the form of an endless ribbon running over a pair of spaced rollers (not shown) within the upper portion of the casing 40, and adjustment of the scale is accomplished by turning a knob 59 fixed to a drive shaft on one of the rollers. This construction is illustrated in the aforesaid Carrigan application and reference is made thereto for further and more specific details.

When it is desired to make a check for either camber or caster, the casing 40 is journalled on the shaft 37 with the latter extending through the upper bores 41, 42, (Figs. 1 to 4) so that the pendulum 49 will swing in a plane normal to the plane in which the wheel 20 is disposed. The wheel is then placed in a plane parallel to the longitudinal axis of the vehicle, i. e., in straight ahead position. Since camber is the amount in inches or degrees that the front wheels are tilted outwardly at the top, it is only necessary to note the degrees indicated on the camber scale 57 by the needle 56 due to tilting of the casing 40 with the shaft 37 while the needle remains in a vertical position.

Caster is the amount in degrees that the king pin is tilted toward the rear of the vehicle. Starting with the parts in the position described immediately above, caster is determined by first turning the wheel in one direction to a predetermined angular position at one side of the straight ahead position, as shown in Fig. 2 and then turning the knob 59 to adjust the scale 58 to bring its zero graduation into registry with the pointer 56. The wheel is then turned to a corresponding angular position at the opposite side of straight ahead position whereupon the resulting change in inclination of the wheel will cause the pointer 56 to indicate the degrees of caster angle on the scale 58.

King pin inclination is the term employed in this art to identify the inclination of the king pin transversely of the vehicle. When this is to be ascertained, the casing 40 is removed from the shaft 37 and turned 90° from the position shown in Figs. 1 to 4 and is remounted on the shaft 37 with the latter extending through the bores 43, 44 (Figs. 5 and 6) so that the pendulum will swing in a plane parallel to the plane in which the wheel 20 is disposed. The wheel is then turned to the same predetermined angle at one side of its straight ahead position as was done in the caster test and the knob 59 is manipulated to adjust the scale 58 to bring its zero graduation into registry with the pointer 56. For the remainder of this test it is necessary that the wheel be prevented from rotating on its spindle and this may be accomplished by setting the vehicle brakes. It is also necessary to prevent the casing 40 from swinging on its supporting shaft 37 and for this purpose the casing is provided with a thumb screw 60 (Fig. 7) for securing the casing to the shaft.

At this time, therefore, the vehicle brakes are set and the thumb screw 60 tightened down and the wheel is then turned to the opposite side of its straight ahead position the same as was done in the caster test. It will now be found that in so turning the wheel the casing 40 has been tilted and the reading of the pointer on the scale 58 will indicate the amount in degrees that the king pin is inclined transversely of the vehicle.

It will be noted that in making each of the above described tests the angle to which the wheel is turned on one side of straight ahead position must be the same as the angle to which the wheel is turned on the opposite side of straight ahead position, and, furthermore, these angles must be the predetermined amount for which the caster and king pin inclination scale of the gauging apparatus is calibrated, otherwise the scale readings will be inaccurate.

The present invention provides a simple attachment which may readily be applied to the wheel to enable it to be set in the proper angular positions referred to. This attachment (Figs. 7 to 11, inclusive) comprises a crosshead 61 having a hub portion 62 and radial arms 63 and 64, each provided with a ring 65 at its end. The rings 65 are recessed as shown at 66 (Figs. 8 and 11) to receive a disc 67 from above. The discs 67 are each provided with an eccentric hole 68 and an eccentric depression 69 diametrically opposite each other and communicating with each other by way of slot 70 terminating at the center of the depression 69.

Associated with each of the arms 63 and 64 is a plumb line 72 and 73, respectively, each having a plumb bob secured to its lower end as indicated at 74 and 75. Each plumb line is preferably a single strand ball-type chain having its upper end extending through the opening 68 in the disc 67 and adapted to slide through the slot 70 to seat one of the balls B of the chain in the depression 69 so that the plumb bobs will hang vertically therefrom.

The free end of the shaft 37 is adapted to extend beyond the casing 40 (Figs. 4 and 6), and the hub 62 of the crosshead 61 is provided with a socket 76 (Figs. 7 and 10) to fit the end of the shaft 37. The hub 62 is secured to the shaft 37 by a set screw 77 in such a manner that the plumb bobs are pendently supported in the manner shown in Fig. 1.

A geometrical diagram of the present invention is illustrated in connection with the plan view thereof (Fig. 4), wherein the crosshead 61 is shown in horizontal position and it is assumed that it is desired to turn the wheel to a position which is 20° from the straight ahead position thereof. It will, therefore, be noted that the radius lines R extending from the midpoint of the king pin K to the centers of the plumb lines 72, 73 are disposed at angles of 10° fore and aft from the axis A of the wheel 20, it being understood that these radius lines R lie in a plane through the wheel axis A which plane is horizontal when the wheel chamber is zero. The crosshead 61, therefore, from one plumb line to the other, represents a chord line C based upon the arc of a 20° sector of a circle having a radius R.

Among different makes and types of vehicles the distance from the king pin to the outer face of the wheel rim varies somewhat according to manufacturer's design, although the maximum variation among present day vehicles is only approximately three inches. Any variation in this distance, however, will, obviously, also vary the length of the radius R as well as the chord line C, and it is, therefore, apparent that the proper distance between the plumb lines, is determined by the distance of the plumb lines from the midpoint of the king pin and by the angle through which it is desired to turn the wheel from straight ahead position.

For purposes of illustration, it will be assumed that one specific manufacturer puts out trucks and passenger cars. The trucks, being heavier, have a front wheel swing which is two inches greater than that of the passenger cars. Such facts being known, the device of the present invention when applied to a truck wheel would establish, for example, a radius R of nineteen inches, and the passenger car wheel a radius r of seventeen inches, from the king pin to the plumb lines of the angle indicator. Assuming that a radius R of nineteen inches is the maximum for all vehicles known in the industry, the length of the crosshead 61 is such that when the crosshead is disposed horizontally on the shaft 37 (Figs. 1 to 4, inclusive) it will define a chord C (from plumb line to plumb line) based upon the arc of a 20° sector of a circle having a nineteen inch radius.

Each plumb line 72 and 73 is adjusted so that the plumb bob carried thereby hangs from the crosshead to just about touch the surface S upon which the wheel 20 is resting. The surface S may be any suitable level, such as the floor of a shop or test room, adapted to receive distinguishable markings, for example, two substantially parallel chalk lines 78 and 79 illustrated in Figs. 1 to 4, inclusive. The lines 78 and 79 are drawn upon the surface S substantially normal to the plane of the wheel in its straight ahead position to indicate the position of plumb bobs 74, 75 relative to the axis A when the wheel 20 is in straight ahead position (Figs. 1 and 4).

Consequently, when the wheel is turned clockwise to the dotted line position shown in Fig. 4 (full line position, Fig. 3) the plumb bob 75 will be disposed above the chalk line 78 and when pointing to the same, will indicate that the wheel has been turned 20° from straight ahead position. The knob 59 is then turned to adjust the graduated scale 58 to bring its zero graduation into registry with the pointer 56. The wheel is then turned counterclockwise until the plumb bob 74 is disposed above and pointing toward the chalk line 79, as is shown in Fig. 2, indicating that the wheel is now positioned 20° counterclockwise from straight ahead position. The reading on the graduated scale 58 is then noted to ascertain the particular caster angle or king pin inclination, as hereinbefore stated.

In the case of checking a passenger car wheel having a shorter than nineteen inch radius from the king pin to the plumb lines (seventeen inches, for example), it is apparent that the chord line of a 20° sector of an arc having such a radius will be proportionately shorter than the chord line C of the previous example. Such a shorter radius is indicated at r in Fig. 4 and the shortened chord line at c. It is, therefore, necessary to adjust the distance between plumb lines 72 and 73 to correspond to the length of the new chord line c and this may be accomplished by rotating the crosshead 61 about the shaft 37 so as to tilt the crosshead arms (Figs. 5 and 6) and thus bring the plumb lines into the proper spacing.

To facilitate accurate adjustment of the crosshead, as stated above, one of the arms 63 thereof is provided with a depending fin 80 (Figs. 5 and 9) extending from the hub 62 to the end of the arm 63. The outer face of the fin 80 is provided with indicia 81, each of which is disposed radially relative to the center of the ball B seated in the depression 69 of the disc 67 associated with the arm 63. The indicia 81 are angularly spaced relative to each other in the fashion of a protractor and are read in conjunction with the position of the plumb line 72 relative to the arm 63. In the specific instance herein recited, the angular disposition of the crosshead would be 26° 32′ from normal or horizontal position in order to space the plumb bobs from each other a distance equal to a chord $c$ for a 20° sector of a circle having a seventeen inch radius $r$.

Consequently, the set screw 77 is released and the crosshead 61 swung clockwise (Fig. 5), until the plumb line 72 hangs in alignment with indicia No. 3 which is 26° 32′ from indicia No. 0. The set screw 77 is again tightened to secure the crosshead 61 in fixed relation with respect to the shaft 37.

The indicia 81 on the face of the fin 80 are arranged to indicate the degree of tilt of the crosshead to suit any one of the various makes and types of automotive vehicles. Each of the indicia is identified by a key number which may be posted on a chart having information printed thereon as to the make and type of car and the angle to which the crosshead must be tilted in order to indicate a 20° turn of the wheel of a particular car.

With the crosshead tilted, as aforesaid, it is necessary to readjust the length of the plumb lines 72, 73 by sliding each ball chain laterally in the respective slot 70 so as to permit lengthening of the chain on one arm and a corresponding shortening of the chain on the opposite arm of the crosshead so that both plumb weights 74, 75 will be disposed just above the surface S. Each chain 72, 73 is again slid through the slot 70 to seat one ball thereof on the depression 69 in the corresponding disc 67. Thereafter, two parallel chalk lines 78′ and 79′ are drawn upon the surface S with the wheel in straight ahead position. The same procedure as stated above in connection with Figs. 2 and 3 is then followed whereby the turning of the wheel into 20° inward and outward positions facilitates the calculation of caster angle and king pin inclination of the passenger car wheel.

Once the plumb lines are spaced a proper distance horizontally from each other in the manner explained above, any visual mark, such as chalk lines on a surface adjacent the plumb bobs will suffice to indicate the straight ahead position of the wheel. When the wheel is turned either direction until one plumb bob registers with the visual mark at the normal position of the other plumb bob, the proper turning angle of the wheel will be attained.

I have pointed out hereinabove that my invention is not limited to use with the particular gauging apparatus illustrated but may be used with other types of gauging apparatus as well, or independently of any gauging apparatus at all.

It will also be understood that in describing my invention as it may be used for determining a wheel turning angle of 20° to each side of straight ahead position, this particular angle has been selected only for purposes of illustration and any other turning angle may be selected instead simply by varying the distance between the slots 70 to correspond to the desired angle. Other modifications and alterations may also be made in the design, construction, or use of my invention without departing from the spirit or scope thereof and I, therefore, desire to avail myself of all such modifications, alterations, variations, and uses as come within the purview of the appended claims.

What I claim as new and desire to protect by Letters Patent is:

1. Apparatus for indicating similar angles of turn of a member turnable about a substantially upright axis in either direction from an initial position, comprising an arm mounted on said member in laterally offset relation to such axis, and with the ends of said arm disposed substantially equidistant from a given point on said axis, and a plumb bob suspended from each end of said arm, each plumb bob being adapted to cooperate with visual marks made on a horizontal surface supporting said member to locate the position of said plumb bobs when said member is in its initial position whereby to indicate that said member is disposed a similar angle of turn to one or the other side of said initial position when said member is turned into a position in which either of said plumb bobs registers with the mark which was made on said surface adjacent the other plumb bob when the member was in its initial position.

2. Apparatus for indicating the angle of turn of a dirigible wheel about a king pin, comprising an arm mounted on and parallel with the face of said wheel and offset a predetermined distance laterally from said king pin, and a pair of plumb bobs suspended from said arm in predetermined spaced relation so as to be disposed substantially equidistant fore and aft of the hub axis of said wheel, said plumb bobs being adapted to cooperate with visual marks made on a wheel supporting surface to locate the position of said plumb bobs when the wheel is in straight ahead position whereby to indicate that the desired angle of turn of the wheel has been attained when said wheel has been turned so that one of said plumb bobs registers with the visual mark located at the position of the other plumb bob when the wheel was in straight ahead position.

3. A turning angle indicator for use with apparatus for checking the caster and king pin inclination of the king pin of a dirigible vehicle wheel, comprising a support mounted on said dirigible wheel substantially in axial alignment with the spindle about which it rotates, an arm mounted midway its ends on said support for tilting movement in a plane parallel to the face of said wheel, and a plumb bob pendently supported at each end of said arm adapted to cooperate with visual marks made on the wheel supporting surface in registration with the plumb bobs when the wheel is in straight ahead position for indicating that said wheel is disposed at a similar angle of turn either inwardly or outwardly from said straight ahead position when said wheel is turned in either direction from straight ahead position until one plumb bob registers with the mark which was made on said wheel supporting surface adjacent the other plumb bob.

4. A turning angle indicator for use with apparatus for checking the caster and king pin inclination of the king pin of a dirigible vehicle wheel, comprising a rod mounted on said wheel substantially in axial alignment with the spindle of said dirigible wheel, an arm mounted midway its ends on said rod for tilting movement in a plane parallel to the face of said wheel, a plumb bob including a plumb line pendently supported at each end of said arm, means for securing said arm in a predetermined position of tilt on said rod for spacing the plumb bobs a predetermined distance from each other dependent upon the angle it is desired to turn said wheel, and means for lengthening or shortening said plumb lines so that said plumb bobs are adapted to cooperate with visual marks made opposite the same on the wheel supporting surface when the wheel is in straight ahead position to indicate that said wheel is disposed at the desired angle of turn from said straight ahead position when the wheel is turned into a position in which either plumb bob registers with the visual mark located, during straight ahead position of the wheel, opposite the other plumb bob.

5. Apparatus for indicating a desired angle of turn of a dirigible wheel about a king pin, comprising an arm mounted on said wheel for tilting movement in a plane parallel to the face of said wheel and about an axis substantially in alignment with the spindle of said dirigible wheel, a pair of plumb lines carrying plumb bobs pendently supported from said arm diametrically opposite each other with respect to the axis of tilting movement of said arm, means for maintaining said arm in tilted position for varying the spacing of said plumb bobs with respect to each other in accordance with the desired angle of turn, and means for adjusting the length of the plumb lines of said plumb bobs for disposing the latter adjacent the wheel supporting surface whereby said plumb bobs will cooperate with visual marks located on the wheel supporting surface to indicate the position of said plumb bobs when the wheel is in straight ahead position so that when the wheel is turned therefrom until one of said plumb bobs registers with the visual mark indicating the position assumed by the other plumb bob during straight ahead position of the wheel, the wheel will be disposed at the desired angle of turn relative to said straight ahead position of the wheel.

6. Apparatus for indicating a desired angle of turn of a dirigible wheel about a king pin, comprising an arm supported for adjustment into different positions of tilt about an axis substantially coinciding with the spindle of said wheel for varying the spacing between a pair of plumb bobs depending from said arm, a pair of plumb bobs having their plumb lines pendently supported on said arm diametrically opposite each other with respect to the axis about which said arm is tiltable, means on said arm cooperating with one of said plumb lines for indicating the angle of tilt of said arm relative to horizontal, and thereby the spacing between said plumb bobs, the angle of tilt being dependent upon the distance of said arm from the king pin and the angle it is desired to turn said wheel, and means for changing the lengths of said plumb lines for disposing said plumb bobs adjacent a wheel supporting surface, said plumb bobs being adapted to cooperate with visual marks located on the wheel supporting surface indicating the position of said plumb bobs when the wheel is in straight ahead position, and for indicating that the desired angle of turn has been attained when the wheel has been turned into a position in which one of said plumb bobs coincides with the visual mark which indicated the position assumed by the other plumb bob when the wheel was in straight ahead position.

7. A turning angle indicator for use with apparatus for checking the caster and king pin inclination of the king pin of a dirigible vehicle wheel, comprising a rod mounted on said wheel substantially in axial alignment with the spindle about which the wheel rotates, an arm mounted midway its ends on said rod for tilting movement in a plane parallel to the face of said wheel, a pair of plumb bobs each having a plumb line pendently supported one from each end of said arm, means for securing said arm in a predetermined position of tilt on said rod for spacing the plumb bobs a predetermined lateral distance from each other based upon the distance of said arm from the king pin and the angle it is desired to turn said wheel, and means for changing the length of the plumb lines of said plumb bobs for disposing the plumb bobs adjacent a wheel supporting surface whereby said plumb bobs will cooperate with visual marks located on said surface at the position of the plumb bobs when the wheel is in straight ahead position to thereby indicate that the wheel has been turned to the desired angle of turn when one of said plumb bobs substantially registers with the visual mark which indicated the position assumed by the other plumb bob when the wheel was in straight thead position.

8. Apparatus for indicating similar angles of turn of a dirigible wheel about a king pin in either direction from straight ahead position, comprising an arm supported on said wheel for tilting movement about an axis which is substantially coaxial with the spindle of said dirigible wheel, a pair of plum bobs each having a plumb line pendently supported on said arm equidistant from the tilt axis of said arm and diametrically opposite each other relative to the same, said arm having a dial thereon cooperating with the plumb line of one of said plumb bobs for indicating the desired tilt of the arm for spacing the plumb bobs from each other a distance determined by the distance of said arm from the king pin and the angle it is desired to turn said wheel, and means for maintaining said arm in the desired tilted position, said plumb bobs being adapted to cooperate with marks located on a wheel supporting surface at the position of said plumb bobs relative to said supporting surface when the wheel is in straight ahead position for subsequently indicating that the proper turning angle of said wheel has been attained when the wheel has been turned until one of said plumb bobs substantially coincides with the mark located on the wheel supporting surface at the position assumed by the other plumb bob when the wheel was in straight ahead position.

9. A turning angle indicator for use with apparatus for checking the caster and king pin inclination of the king pin of a dirigible vehicle wheel, comprising a bracket secured to said wheel for movement therewith, a shaft mounted on said bracket substantially in alignment with the spindle of said wheel, an arm mounted on said shaft for tilting movement, a pair of plumb bobs having plumb lines pendently supported on said arms substantially equidistant from said shaft and diametrically opposite each other with respect to said shaft, means for securing said arm in a predetermined tilted position relative to said shaft for spacing said plumb bobs from each other a distance determined by the angle it is desired to turn the wheel and the distance between said arm and the king pin, and means for changing the lengths of the plumb lines of said plumb bobs dependent upon the tilted position of said arm to dispose said plumb bobs adjacent the wheel supporting surface for facilitating marking on said surface the positions assumed by said plumb bobs when the wheel is in straight ahead position whereby when the wheel is turned into a position in which either plumb bob registers with the mark indicating marked position assumed by the opposite plumb bob during straight thead position of the wheel said wheel will be disposed at the desired angle of turn.

10. A turn indicator for a dirigible vehicle wheel rotatably mounted on a spindle to turn about a king pin as a pivot, the wheel being initially supported in straight ahead position on a horizontal supporting surface, the indicator comprising a plumb bob support adapted to be secured to said wheel in outwardly spaced relation thereto away from said king pin, a pair of plumb bobs mounted to depend from said plumb bob support at equal distances from the king pin and in predetermined separation from each other, the plumb bobs being adjusted to hang close to, but clear of, the wheel supporting surface, the separation between the plumb bobs being so related to their distances from the king pin as to indicate a predetermined angle of turning movement of the wheel about the king pin when the wheel is turned to bring one of said plumb bobs directly over a line on the supporting surface which line is substantially normal to the plane of the wheel in its straight ahead position and over which line the other plumb bob was located in the straight ahead position of the wheel.

11. A turn indicator for a dirigible vehicle wheel rotatably mounted on a spindle to turn about a king pin as a pivot, the wheel being initially supported in straight ahead position on a horizontal supporting surface, the indicator comprising a plumb bob support adapted to be mounted for pivotal adjustment substantially coaxially with said wheel spindle and spaced outwardly from said wheel along such common axis away from said king pin, a pair of plumb bobs mounted to depend from said plumb bob support in predetermined separation from each other, means for adjusting the plumb bobs to depend close to, but clear of, the wheel supporting surface, the separation between the plumb bobs being adjusted, by pivotal adjustment of the plumb bob support about its axis, to a predetermined distance relatively to their distances from the king pin, thereby to indicate a predetermined angle of turning movement of the wheel about the king pin when the wheel is turned to bring one of said plumb bobs directly over a line on the supporting surface which line is substantially normal to the plane of the wheel in its straight ahead position and over which line the other plumb bob was located in the straight ahead position of the wheel.

12. An arrangement as in claim 11 wherein an angle of tilt indicator is mounted adjacent one of said plumb bob lines to be swept thereby on a pivotal movement of said plumb bob support, and angle marking indicia on said indicator adapted to align with said one plumb bob line in predetermined angle of tilt of the plumb bob support.

13. Apparatus for indicating similar angles of turn of a member turnable about a substantially upright axis from an initial position comprising an arm mounted on said member so that a line extending transversely from said axis at a given point thereon intersects the midpoint of said arm whereby the ends of said arm are equidistant from said given point on said axis, and a plumb bob suspended from each end of said arm, each plumb bob being adapted to cooperate with visual marks made on a horizontal surface supporting said member to locate said plumb bobs when said member is in its initial position whereby to indicate that said member is disposed at a similar angle of turn to one or the other side of said initial position when said member is turned into a position in which either of said plumb bobs registers with the mark on said surface which was adjacent the other plumb bob when said member was in its initial position.

14. Apparatus for indicating a predetermined angle of turn of a member turnable about a substantially upright axis from an initial position comprising an arm mounted on said member so that a line extending transversely from said axis at a given point thereon intersects the midpoint of said arm whereby the ends of said arm are equidistant from said given point on said axis, and a plumb bob suspended from each end of said arm to locate visual marks on a horizontal surface supporting said member when said member is in its initial position and adapted to indicate a predetermined angle of turn when said member is turned to place one plumb bob adjacent the visual mark which was adjacent the other plumb bob when said member was in its initial position.

IRVING FRAZEE.

REFERENCES CITED

The following references are of record in the file of this patent:

UNITED STATES PATENTS

| Number | Name | Date |
|---|---|---|
| 171,974 | Beckwith | Jan. 11, 1876 |
| 649,636 | Gothan | May 15, 1900 |
| 2,079,070 | Johnston | May 4, 1937 |